United States Patent
Yoshii et al.

(10) Patent No.: US 6,754,548 B1
(45) Date of Patent: Jun. 22, 2004

(54) REPRODUCING DEVICE HAVING REPRODUCING LIMITING FUNCTION, APPARATUS FOR REWRITING REPRODUCING LIMITATION INFORMATION, REPRODUCING LIMITING METHOD, METHOD OF REWRITING REPRODUCING LIMITATION INFORMATION AND PROGRAM STORAGE MEDIUM

(75) Inventors: Fumihiko Yoshii, Tokyo (JP); Keiko Tada, Kanagawa (JP)

(73) Assignee: Sony Corporation, Tokyo (JP)

( * ) Notice: Subject to any disclaimer, the term of this patent is extended or adjusted under 35 U.S.C. 154(b) by 679 days.

(21) Appl. No.: 09/650,248

(22) Filed: Aug. 29, 2000

(30) Foreign Application Priority Data

Aug. 31, 1999 (JP) .......................................... 11/246477

(51) Int. Cl.⁷ .............................................. G06E 17/00
(52) U.S. Cl. ......................... 700/94; 369/47.12; 369/84
(58) Field of Search ........................ 700/94; 369/35.01, 369/30.05, 47.12, 84; 386/94, 46; 381/61; 704/270, 272, 278

(56) References Cited

U.S. PATENT DOCUMENTS 6,163,644 A * 12/2000 Owashi et al. ................ 386/46

FOREIGN PATENT DOCUMENTS

JP 11-213550 * 6/1999 ........... G11B/20/10

* cited by examiner

*Primary Examiner*—Melur Ramakrishnaiah
(74) *Attorney, Agent, or Firm*—Frommer Lawrence & Haug LLP; William S. Frommer; Gordon Kessler

(57) ABSTRACT

According to this invention, when the header is detected from the digital music contents that has been stored in the flash memory and has the header composed of the reproducible period of time, the number of reproducible times and the number of reproduced times, and the music data, if reproducing instruction is given, the number of reproduced times is incremented and updated according to the above instruction, and at the same time, when the number of reproduced times is within the range of the number of reproducible times, the music data is reproduced according to the reproducing instruction. Thereby, its reproducing processing without limitation over the reproducible period of time can be surely prevented.

18 Claims, 12 Drawing Sheets

REPRODUCING DEVICE HAVING REPRODUCING LIMITING FUNCTION, APPARATUS FOR REWRITING REPRODUCING LIMITATION INFORMATION, REPRODUCING LIMITING METHOD, METHOD OF REWRITING REPRODUCING LIMITATION INFORMATION AND PROGRAM STORAGE MEDIUM

BACKGOUND OF THE INVENTION

1. Field of the Invention

The present invention relates to a reproducing apparatus having reproducing limiting function, an apparatus for rewriting reproducing limitation information, a reproducing limiting method, a method of rewriting reproducing limitation information and a program storage medium, and more particularly, is suitably applied for example to the case of reproducing digital music contents with reproducing limitation distributed in an electric music distribution service.

2. Description of the Related Art

Heretofore, an electric music distribution service called electric music distribution (EMD) in which digital music contents are distributed using a computer network by Internet has been provided.

In this kind of electric music distribution service, the digital music contents is distributed from an EMD server that supplies the contents to a personal computer in a home (hereinafter, this is referred to as computer device) via Internet. In the computer device in the home, the digital music contents distributed from the EMD server is downloaded into an internal hard disk. This will be reproduced according to user's operation, so that the user can enjoy music at any time.

In such electric music distribution service, on the one hand there has been the system of buying called "purchase" in which the digital music contents downloaded into the computer device from the EMD server can be reproduced at any time or any number of times as if it is a compact disc (CD), on the other hand there has been a new buying system called "with reproducing limitation" by which reproducing limitation on a reproducible period of time and the number of reproducible times will be added as a service in which charges have been down.

Furthermore, these days, a portable digital recording and reproducing device which can record the digital music contents from the above computer device on a recording medium such as a magneto-optical disc, a flash memory or the like in digital data by connecting to the computer device has been gained popularity. Thereby, the digital music contents distributed from the EMD server can be transferred from the computer device and recorded on the recording medium in digital data.

Accordingly, the portable digital recording and reproducing device is controlled so as to be reproducible in case of the digital music contents of "purchase" at any time or any number of times, however, in case of the digital music contents "with reproducing limitation" of which the reproducible period of time has been limited, it is controlled so as to reproduce the digital music contents only within the reproducible period of time by managing the reproducible period of time by the clock function of a real time clock (RTC) circuit loaded inside.

By the way, in a digital recording and reproducing device having the above configuration, there has been a problem that when the time of the RTC circuit has returned to the past with malicious intent, even if the reproducible period of time has passed, digital music contents which was purchased "with reproducing limitation" can be illegally reproduced at any number of times, and the digital music contents "with reproducing limitation" cannot be limited so as to be reproduced only within the reproducible period of time.

SUMMARY OF THE INVENTION

In view of the foregoing, an object of this invention is to provide a reproducing device having reproducing limiting function, an apparatus for rewriting reproducing limitation information, a reproducing limiting method, a method of rewriting reproducing limitation information and a program storage medium that can prevent illegal reproducing of contents of data of which the reproducible period of time has been limited.

The foregoing object and other objects of the invention have been achieved by the provision of a reproducing device having reproducing limiting function in which when reproducing limitation information has been detected from contents data that has been stored in a prescribed storage medium and has the reproducing limitation information composed of a reproducible period of time, the number of reproducible times and the number of reproduced times, and reproducing data, if reproducing instruction is given, the number of reproduced times is incremented and updated according to the above instruction, and at the same time, when the number of reproduced times is within the range of the number of reproducible times, the reproducing data is reproduced according to the reproducing instruction. Thereby, its reproducing processing without limitation over the reproducible period of time can be surely prevented.

Furthermore, according to the present invention, reproducing limitation information is read from a prescribed storage medium in which contents data including the reproducing limitation information composed of a reproducible period of time, the number of reproducible times and the number of reproduced times and reproducing data has been stored. Whether or not it is within the range of the reproducible period of time is confirmed based on reference date data on a reference date. If it is within the range of the reproducible period of time, the number of reproduced times is rewritten to zero. So that if it is within the range of the reproducible period of time, the contents data can be repeatedly reproduced any number of times for the number of reproducible times.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Summary

Figure 1:
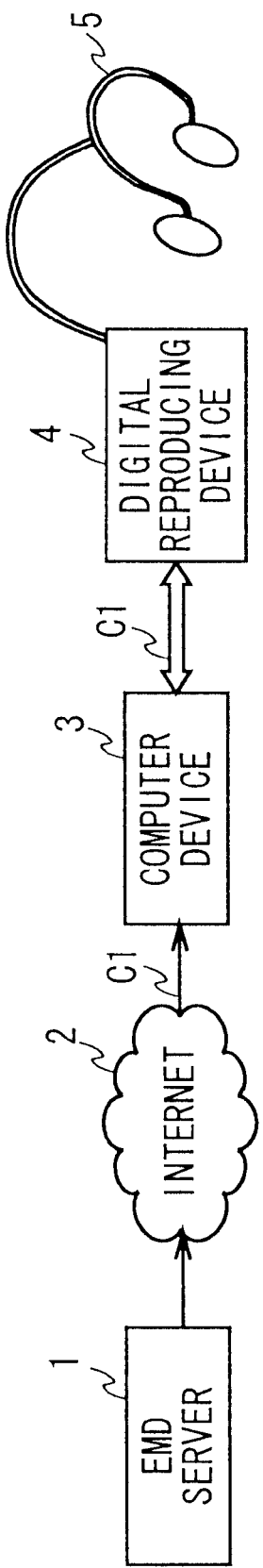
FIG. 1 is a block diagram for explaining a form of the use of digital music contents.

First, a form of the use of digital music contents as contents data distributed by an electric music distribution service will be described. As shown in FIG. 1, in the electric music distribution service, digital music contents C1 distributed from an electric music distribution (EMD) server 1 via an Internet 2 is downloaded into a computer device 3 installed in user's house.

At this time, the user can purchase the digital music contents C1 from the EMD server 1 "with reproducing limitation". The above purchased digital music contents C1 can be reproduced by the computer device 3 within the range of a reproducible period of time or the number of reproducible times.

Furthermore, the computer device 3 can be connected to a portable-type digital reproducing device 4 having a non-volatile flash memory built-in as a recording medium through a universal serial bus (USB) cable. Thereby, the digital music contents C1 can be uploaded into the flash memory of the digital reproducing device 4 in digital data.

Thus, the user can reproduce the digital music contents C1 "with reproducing limitation" within the range of the reproducible period of time or the number of reproducible times not only by the computer device 3 but also the digital reproducing device 4. So that the user can easily enjoy the music in high sound quality via a headphone 5 even outdoors.

Figure 2A:
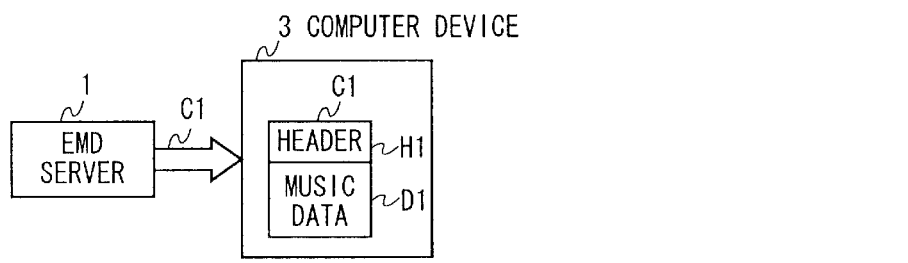
FIGS. 2A to 2C are schematic diagrams for explaining the reproducing limitation on the digital music contents.

Practically, as shown in FIG. 2A, the digital music contents C1 "with reproducing limitation" downloaded into the computer device 3 from the EMD server 1 is composed of a header H1 as reproducing limitation information and music data D1 as reproducing data as one. In the above header H1, various information on the reproducing limitation such as the reproducible period of time, the number of reproducible times and number of reproduced times or the like have been stored.

Figure 2B:
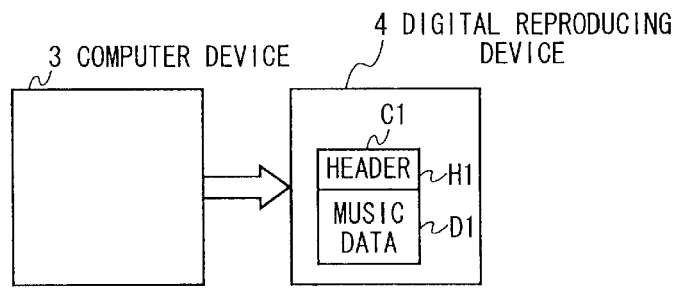

Then, as shown in FIG. 2B, the computer device 3 uploads the digital music contents C1 into the flash memory of the digital reproducing device 4 in digital data.

When executing its reproducing processing according to user's reproducing operation, the digital reproducing device 4 always reproduces the music data D1 after reading the reproducing limitation information of the header H1. Thereby, the reproducing limitation information to be managed by the header H1 will be effectively utilized to prevent illegal reproducing processing.

By the way, in the digital reproducing device 4 of this embodiment, an RTC circuit is not loaded, and the reproducible period of time cannot be managed by a clock function. So that even if the reproducing limitation information of the header H1 is read, whether the digital music contents C1 is within the reproducible period of time or not cannot be determined. It permits reproducing the digital music contents C1 without limitation.

To prevent such things, even if it is within the reproducible period of time, the digital reproducing device 4 permits performing its reproducing processing only within the range of "the number of reproducible times (e.g. twice)" prescribed by the reproducing limitation information of the header H1. And if "the number of reproduced times" updated when it has practically reproduced reaches "the number of reproducible times", protection to limit its reproducing processing is given.

Figure 2C:
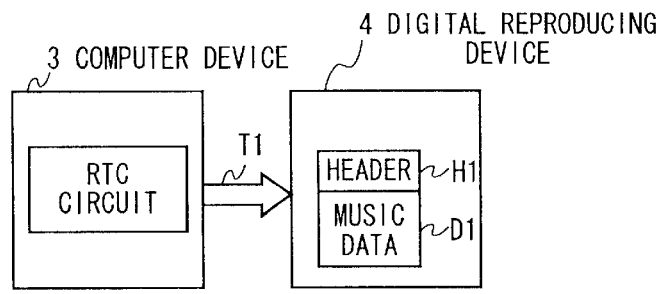

In this state, however, the digital reproducing device 4 cannot reproduce it only twice in spite of being within the range of the reproducible period of time. Therefore, as shown in FIG. 2C, by connecting again to the computer device 3, the digital reproducing device 4 receives supply of the present time information T1 from an RTC circuit built in the above computer device 3 and determining whether it is within the reproducible period of time or not based on the above time information T1. When being within the range of the reproducible period of time is recognized, "the number of reproduced times" of the header H1 is rewritten to "0".

Thereby, when it is within the range of the reproducible period of time, the digital reproducing device 4 can execute the aforementioned reproducing processing any number of times only within the range of "the number of reproducible times (e.g. twice) prescribed by the reproducing limitation information of the header H1.

On the other hand, when that the reproducible period of time has expired is recognized based on the time information T1, the digital reproducing device 4 does not execute its reproducing processing without rewriting "the number of reproduced times" of the header H1 to "0".

In this manner, the digital reproducing device 4 repeats the aforementioned reproducing processing up to "the number of reproducible times" and the check of the reproducible period of time by connected to the computer device 3. So that if it is within the range of the reproducible period of time, the digital reproducing device 4 can repeatedly execute its reproducing processing up to "the number of reproducible times (twice)" at any number of times, and if the reproducible period of time has expired, it can limit its reproducing processing.

On the contrary, in case of digital music contents C1 to which only the reproducing limitation on the number of reproducible times has been added, the digital reproducing device 4 executes its reproducing processing within the range of that number of reproducible times. If it has reproduced the number of reproducible times, the digital reproducing device 4 does not execute its reproducing processing after that.

Figure 3:
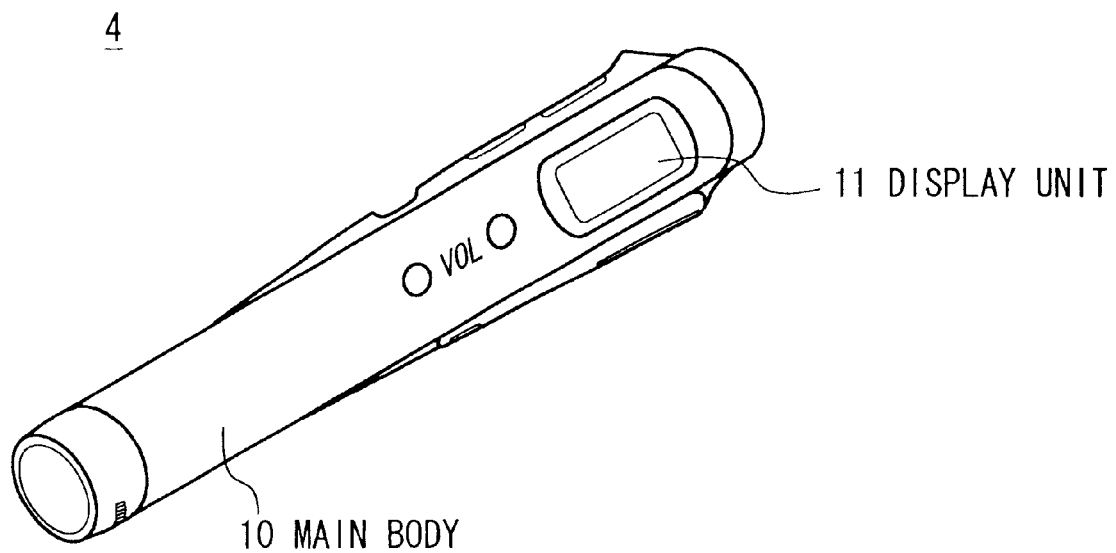
FIG. 3 is a schematic perspective view showing the exterior of a digital reproducing device of this embodiment.

(2) Configuration of Digital Reproducing Device (2-1) Exterior of Digital Reproducing Device As shown in FIG. 3, the digital reproducing device 4 as a reproducing device having reproducing limiting function according to the present invention is formed so that it has an external appearance in almost cylindrical form and has main body 10 housing a recording medium being a nonvolatile flash memory (not shown) inside, and a display unit 11 composed of various operation switches and operation buttons and a liquid crystal display has been provided on the circumferential side face of the above main body 10.

Here, when taking side views of the digital reproducing device 4 as that the side having the display unit 11 is the front, each of the circumferential side faces when the main body 10 has turned on its axis by 45° will be described with reference to FIGS. 4A to 4D.

Figure 4:
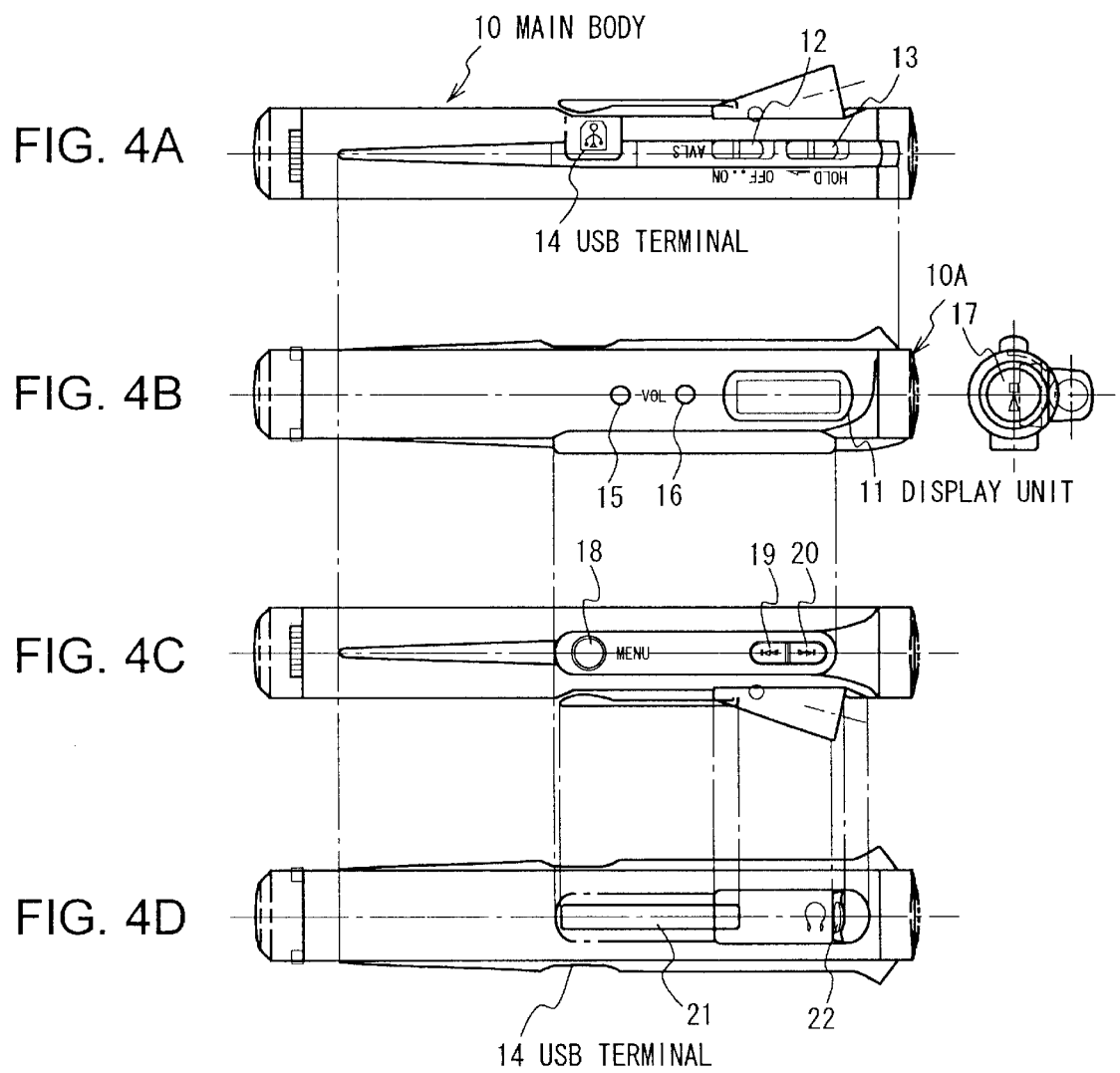
FIGS. 4A to 4D are side views showing the circumferential side views of the digital reproducing device.

Referring to FIG. 4A, on the left side face of the main body 10, a maximum volume fixing switch 12 to fix the maximum volume, a hold switch 13 to lock the state of the various operation switches and a USB terminal 14 to connect the digital reproducing device 4 to the computer device 3 via a USB cable (not shown) have been provided.

On the other hand, referring to FIG. 4B, on the front side face of the main body 10, the display unit 11, a volume up button 15 and a volume down button 16 have been provided. On an end face 10A, a reproducing/stop button 17 to perform reproducing and stop has been provided.

Furthermore, referring to FIG. 4C, on the right side face of the main body 10, a menu button 18 to switch menu contents displayed on the display unit 11, a fast-rewinding button 19 and a fast-forwarding button 20 have been provided. Moreover, as shown in FIG. 4D, on the back face of the main body 10, a clip 21 and a headphone terminal 22 to connect the headphone 5 (FIG. 1) have been provided.

(2-2) Circuitry of Digital Reproducing Device 4

Figure 5:
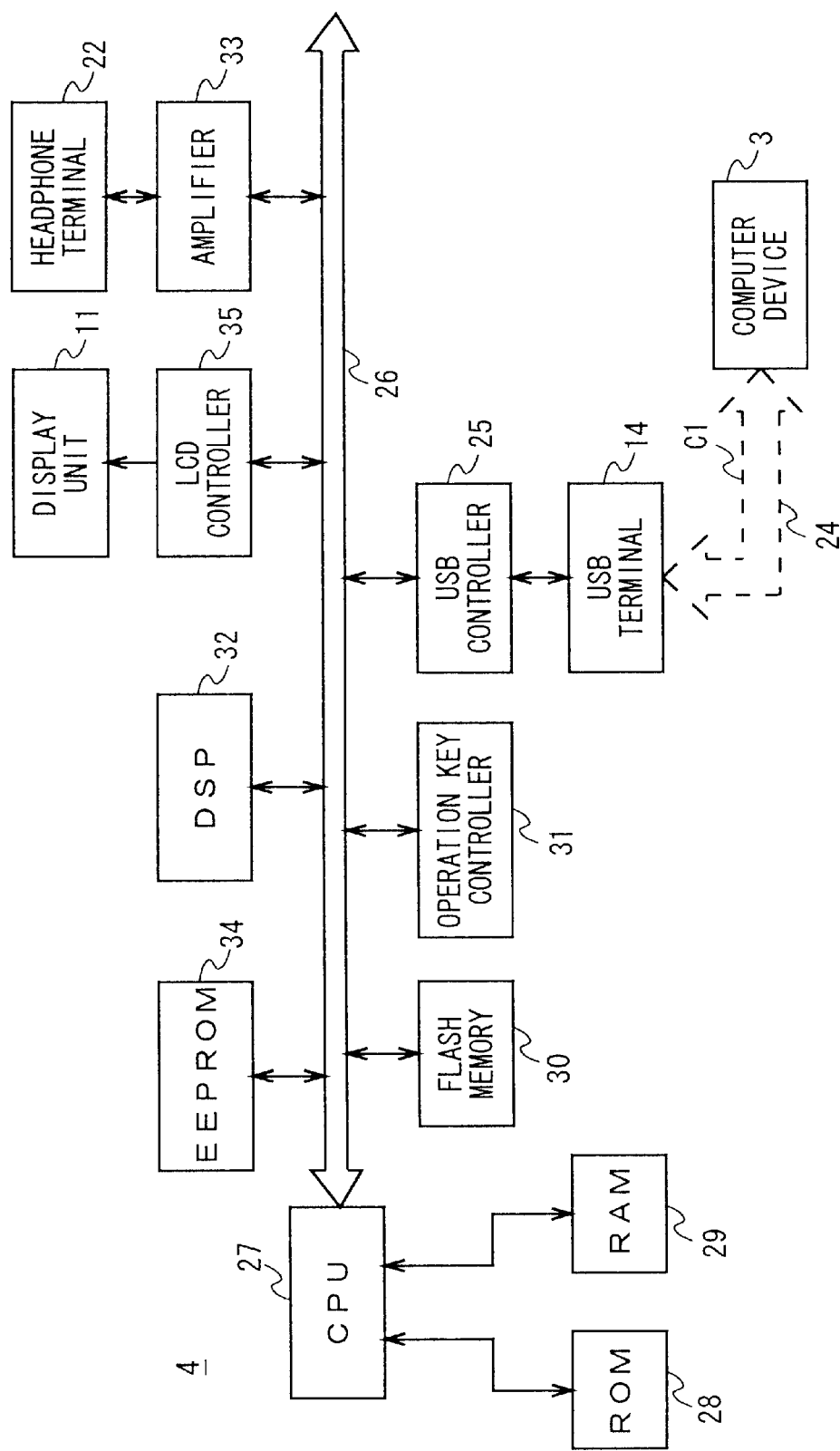
FIG. 5 is a block diagram showing the circuitry of the digital reproducing device.

Next, the circuitry of a digital reproducing device 4 having such exterior will be described with reference to FIG. 5. When the digital reproducing device 4 has been connected to the computer device 3 by a USB cable 24 via a USB terminal 14, it transmits the digital music contents C1 transferred from the above computer device 3 to the CPU 27 from a USB controller 25 via an internal bus 26.

Figure 6:
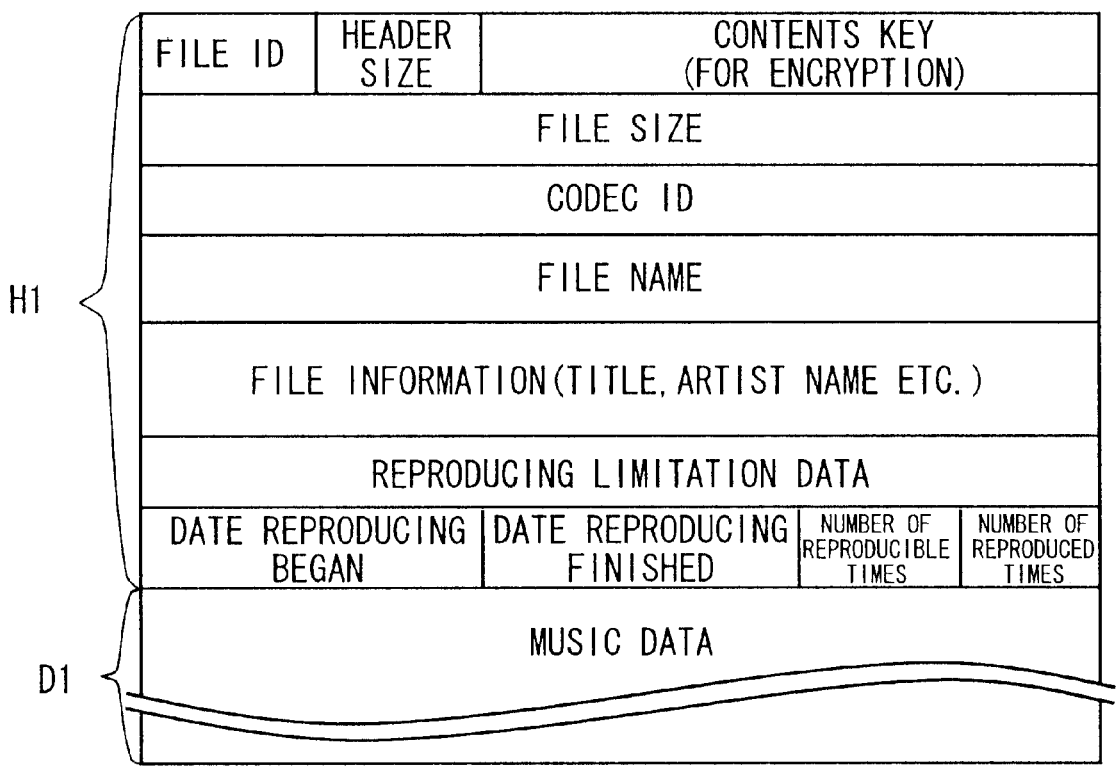
FIG. 6 is a schematic diagram showing the data structure of the digital music contents.

Here, as shown in FIG. 6, the digital music contents C1 is composed of a header H1 and music data D1. In the header H1 as reproducing limitation information, "file ID", "header size", "contents key (for encryption)", "file size", "codec ID", "file name" and "file information" have been stored, and also as reproducing limitation information necessary for reproducing limiting processing, "reproducing limitation data", "date reproducing began", "date reproducing finished", "the number of reproducible times" and "the number of reproduced times" have been stored.

Figure 7:
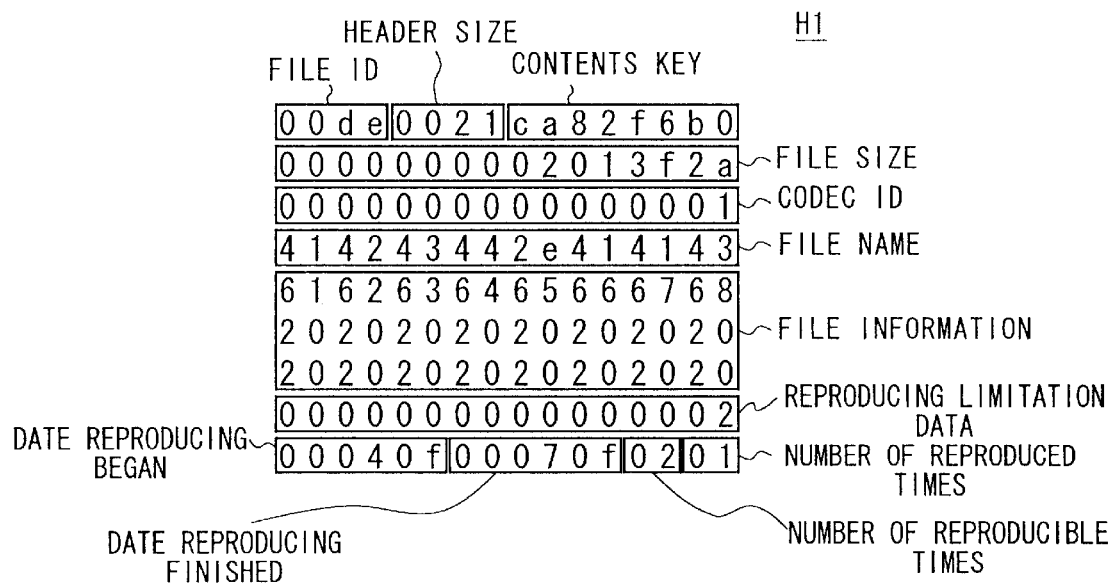
FIG. 7 is a schematic diagram showing the data structure of a header.

FIG. 7 shows an example of this header H1 when the stored information have been displayed in hexadecimal numbers respectively. In this case, that the "header size" is 33 bytes and the "file size" is 33636138 bytes has been shown. On the other hand, the "contents key" is cipher data for deciphering the music data D1 as reproducing data (FIG. 6), and when the transmitting and receiving of the digital music contents C1 is practically performed between the computer device 3 and the digital reproducing device 4, it will be transferred in further enciphered by a common session key.

The "codec ID" is an ID number corresponding to an extending system when the music data D1 of the digital music contents C1 is reproduced by the digital reproducing device 4. To an ID number "1", an extending system corresponding to a data compression method, called "adaptive transform acoustic coding (ATRAC) 3" has been assigned. And to an ID number "0", an extending method corresponding to the data compression method, called "MPEG audio layer-3 (MP3)" has been assigned.

The "file name" is data for example that the file name of the digital music contents C1 "ABCD, AAC" has converted into American National Standard Code for Information Interchange (ASCII) code. And the "file information" is data that the title of tune, artist name, lyricist, composer or the like of the digital music contents C1 have converted into ASCII code.

The "reproducing limitation data" is data showing whether or not to the digital music contents C1 to be reproduced by the digital reproducing device 4, the reproducing limitation of the reproducible period of time or the number of reproducible times has been added. Only when there is a limit to the number of reproducible times, "1" has been assigned. Only when there is a limit to the reproducible period of time, "2" has been assigned. And when there is no reproducing limitation, that is, when it is the digital music contents C1 bought in "purchase", "0" has been assigned.

The "date reproducing began" and the "date reproducing finished" are data showing the range of the reproducible period of time when the "reproducing limitation data" is "2". The data of "00040F" and "00070F" show that "Apr. 15, 2000" to "Jul. 15, 2000" is the range of the reproducible period of time.

Similarly, "the number of reproducible times" and "the number of reproduced times" are data showing the maximum number of reproducible times previously prescribed and the actual number of reproduced times updated by the CPU 27 when the reproducing processing has executed when the "reproducing limitation data" is "1" and "2". The data of "02" and "01" show that "the number of reproducible times" is "2" times (twice) and "the number of reproduced times" at the present time point is "1" time (once).

Therefore, according to the reproducing limitation information of the header H1, the digital reproducing device 4 can repeatedly execute the reproducing processing twice one time any number of times if it is within the range of "Apr. 15, 2000" to "Jul. 15, 2000".

Figure 8:
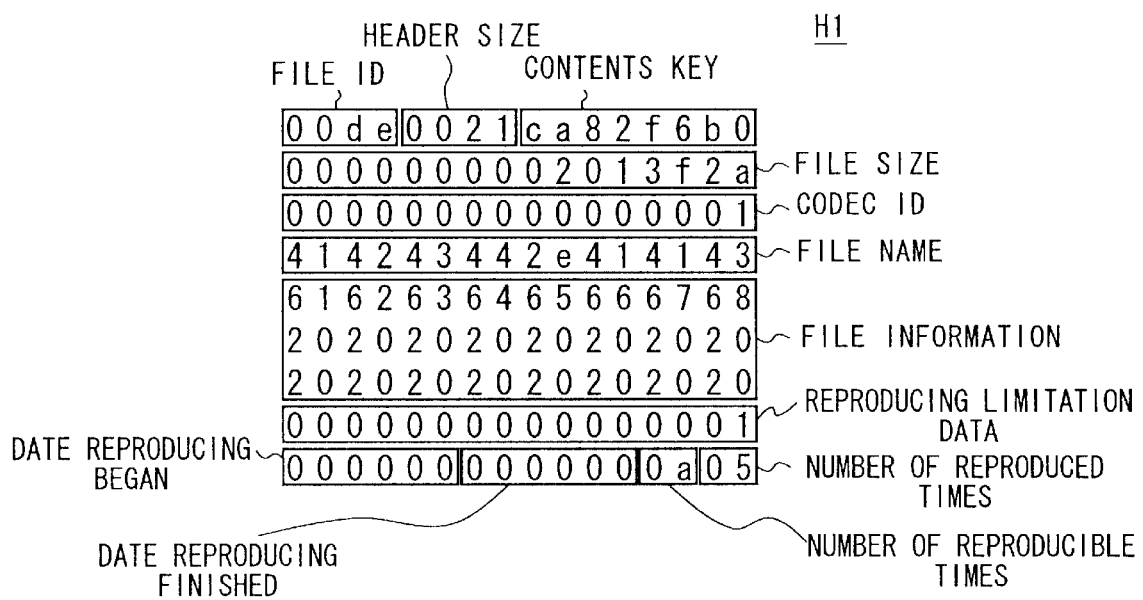
FIG. 8 is a schematic diagram showing the data structure of a header.

In this connection, in the header H1 of the digital music contents C1 to which only the reproducing limitation of the number of reproducible times has been, for example, as shown in FIG. 8, the "reproducing limitation data" shows "1", the "date reproducing began" and the "date reproducing finished" are "000000" and "000000", and "the number of reproducible times" and "the number of reproduced times" are "0a" and "05". That is, it shows that there is no limit to the reproducible period of time by the "date reproducing began" and the "date reproducing finished", "the number of reproducible times" is "10" times, and "the number of reproduced times" at present is "5" times in that.

By the way, a write command of the digital music contents C1 has been transferred to the digital reproducing device 4 from the computer device 3 along with the digital music contents C1. If the CPU 27 receives the write command from a random access memory (RAM) 29, it writes the digital music contents C1 in the flash memory 30 according to a program that has been read from a read-only memory (ROM) 28 to the RAM 29.

In this connection, when in connected to the computer device 3 via the USB cable 24 as connecting means, the digital reproducing device 4 does not execute various operations by a maximum volume fixing switch 12, a hold switch 13, a volume-up button 15, a volume-down button 16, a reproducing/stop button 17, a menu button 18, a fast-rewinding button 19, and a fast-forwarding button 20. The CPU 27 operates only by control from the computer device 3, and the digital music contents C1 is written in the flash memory 30.

Furthermore, in the flash memory 30, reproducing codes for performing its reproducing by an extending system that corresponds to the music data D1 data-compressed by a prescribed compression system has been previously stored.

Accordingly, in the digital reproducing device 4, if a reproducing command according to the depressing operation of the reproducing/stop button 17 by the user is given to the CPU 27 via an operation key controller 31, the "codec ID" is read from the header H1 of the digital music contents C1 by the above CPU 27, and a reproducing code that corresponds to the above read "codec ID" and the music data D1 of the digital music contents C1 are transferred to the RAM of a digital signal processor (DSP) 32 (not shown) from the flash memory 30.

The DSP 32 extends and reproduces the music data D1 based on the reproducing code transferred from the flash memory 30, and transmits this to an amplifier 33.

The amplifier 33 transmits the reproduced music data D1, after amplifying this to a predetermined level, from a headphone terminal 22 to the headphone 5, and supplying the reproduced music to the user via the above headphone 5.

On the other hand, in the digital reproducing device 4, in an electrically erasable programmable read-only memory (EEPROM) 34, the number of tunes of all the digital music contents C1 read in the flash memory 30, block positions where each of the digital music contents C1 have been stored, various memory storage information, etc. have been stored.

Moreover, in the EEPROM 34, a program to prevent users altering reproducing limitation information on reproducing limiting processing such as the "date reproducing began" and the "date reproducing finished", "the number of reproducible times" and "the number of reproduced times", etc., that represent the range of the reproducible period of time of the header H1, has been stored. Thus, illegal reproducing processing can be previously prevented.

Furthermore, in the EEPROM 34, a reproducing limiting program to determine whether or not it is within the range of the reproducible period of time according to the "date reproducing began" and the "date reproducing finished" written in the header H1 of the digital music contents C1 based on the time information T1 from the computer device 3, and if it is within the range, rewrite "the number of reproduced times" to "0", but if it is out of the range, limit its reproducing processing, has been stored. The CPU 27 limits the reproducing processing of the digital music contents C1 based on the reproducing limiting program.

Note that, with respect to the digital music contents C1 having the reproducing limitation only on the number of reproducible times, the CPU 27 executes its reproducing processing only within the range of "the number of reproducible times" based on the aforementioned reproducing limiting program.

Practically, if the reproducing/stop button 17 is depressed by the user when the digital music contents C1 downloaded from the computer device 3 is not being reproduced, the digital reproducing device 4 reads "the reproducing limitation data" of the header H1 by the CPU 27, and then reproduces the music data D1.

At this time, when that limitation on the reproducible period of time has been added to the digital music contents C1 is determined based on the value "2" of the "reproducing limitation data" read from the header H1, the CPU 27 reads the "date reproducing began" and the "date reproducing finished" of the header H1, and displays a comment that "Reproducible from date ○ Δ to date ○ X" on the display unit 11 via a liquid crystal display (LCD) controller 35.

Moreover, when the actual "number of reproduced times" has reached "the number of reproducible times (e.g. twice)" prescribed in the header H1, even if it is within the range of the reproducible period of time, the CPU 27 switches the comment to that "Check reproducible period of time" via the liquid crystal display (LCD) controller 35 and displays on the display unit 11 without executing its reproducing processing.

On the other hand, when that limitation on the number of reproducible times has been added to the digital music contents C1 based on the value "1" of the "reproducing limitation data" read from the header H1, the CPU 27 increments "the number of reproduced times" of the header H1 according to the depression of the reproducing/stop button 17, and displays the comment of "the number of reproduced times/the number of reproducible times" that shows "the number of reproducible times" and "the number of reproduced time" at the present time point in the above number of reproducible times on the display unit 11 via the LCD controller 35.

Figure 9:
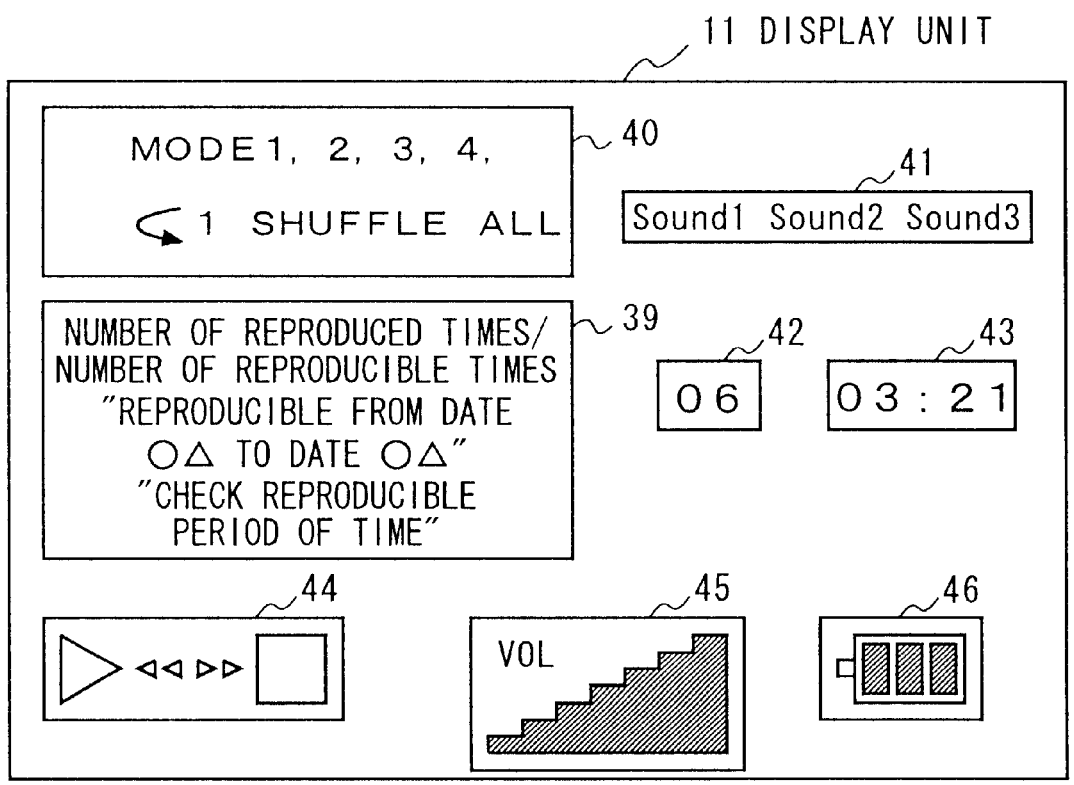
FIG. 9 is a schematic diagram illustrating display contents of a display unit.

Practically, as shown in FIG. 9, in the display unit 11, a reproducing limitation display area 39 has been provided, and one of the comments "number of reproduced times/number of reproducible times", "Reproducible from date ○ Δ to date ○ X" or "Check reproducible period of time" that represent the concrete contents of the reproducing limitation information can be displayed.

That is, in the display unit 11, in the case where the limitation on the number of reproducible times has been added to the digital music contents C1, the comment of "the number of reproduced times/the number of reproducible times" is displayed in the reproducing limitation display area 39, and in the case where the limitation on reproducible period of time has been added to the digital music contents C1, a comment "Reproducible from date ○ Δ to date ○ X" or a comment "Check reproducible period of time" is displayed in the reproducing limitation display area 39. Thereby, the contents of the reproducing limitation information in the digital music contents C1 bought "with reproducing limitation" can be informed to the user.

Note that, in the display unit 11, other than the reproducing limitation display area 39, a mode display part 40, a sound switching display part 41 for equalizer adjustment, a tune number display part 42, a reproduced time display part 43, a processing state display part 44 showing reproducing, stop, fast-forwarding, fast-rewinding, a volume indicator 45 in seven levels and a remaining battery indicator 46 in three levels have been provided.

In the mode display part 40, if the fast-forwarding button 20 is depressed in the state where the menu button 18 on the main body 10 by the user, display is switched from "MODE 1" to "MODE 4" in turn by the control of the CPU 27. Here, the "MODE 1" means "reproducing only one tune", the "MODE 2" means "repeatedly reproducing only one tune", the "MODE 3" means "repeatedly reproducing in shuffled order" and the "MODE 4" means "repeatedly reproducing all the tunes in order".

On the other hand, in the sound switching display part 41, if the fast-rewinding button 19 on the main body 10 is depressed by the user, display is switched from "Sound 1" to "Sound 3" in order by the control of the CPU 27. Here, the "Sound 1" shows that the lower register of reproducing sound is emphasized, the "Sound 2" shows that the medium register of reproducing sound is emphasized and the "Sound 3" shows that the higher register of reproducing sound is emphasized.

(3) Reproducing Limiting Processing Procedure of Digital Music Contents C1

Figure 10:
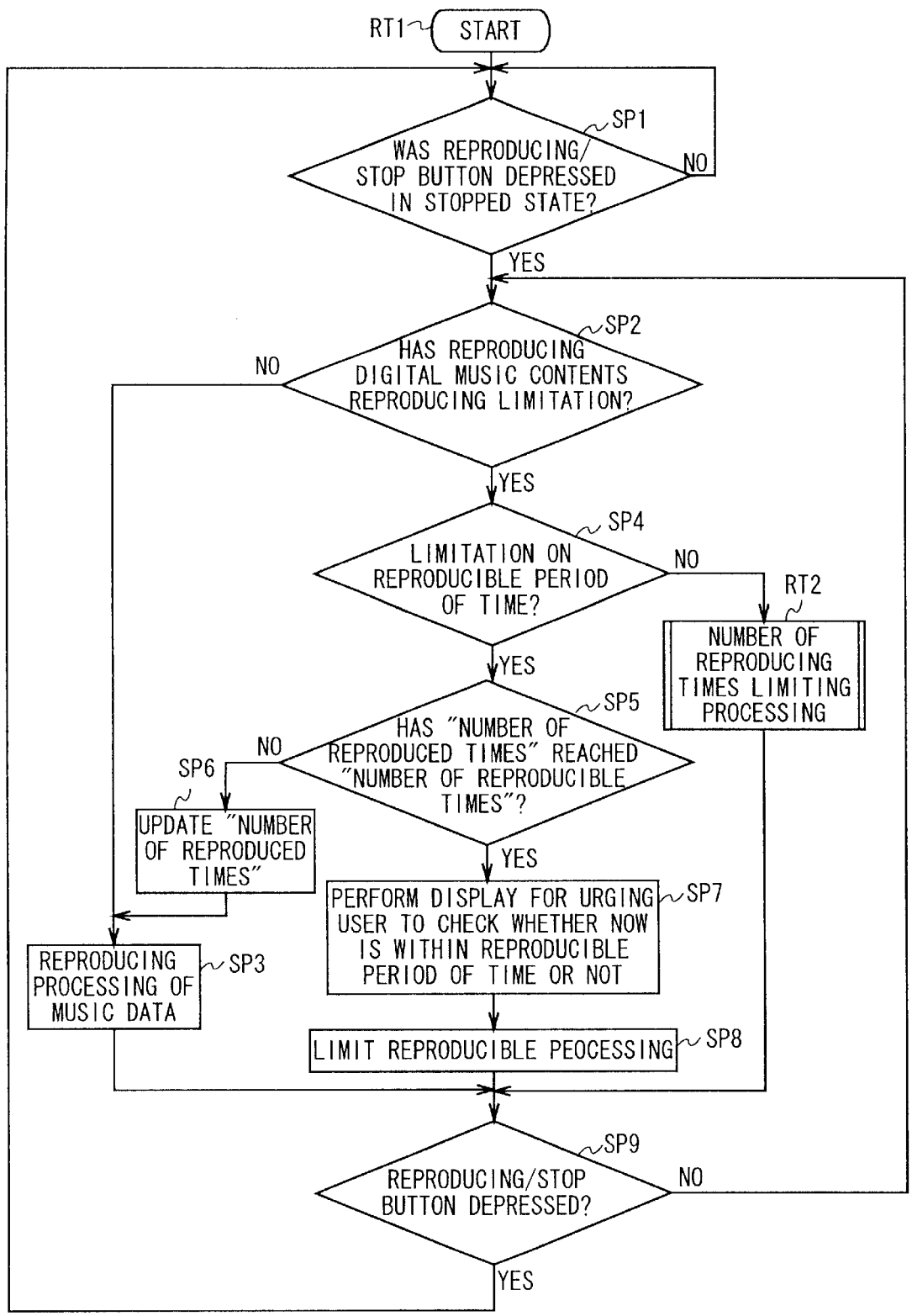
FIG. 10 is a flowchart showing reproducing limiting processing procedure.

Next, when the digital music contents C1 "with reproducing limitation" is reproduced in the digital reproducing device 4, reproducing limitation processing procedure in which reproducing limiting processing is performed respectively according to the reproducible period of time or the number of reproducible times will be described with reference to a flowchart of FIG. 10.

The CPU 27 of the digital reproducing device 4 enters the processing from the start step of routine RT1 and proceeds to step SP1. In step SP1, the CPU 27 determines whether or not the reproducing/stop button 17 as reproducing instructing means is depressed by the user in a stop state where the digital music contents C1 downloaded from the computer device 3 is not being reproduced.

Here, if a negative result is obtained, this means that the reproducing/stop button 17 is not depressed. At this time, the CPU 27 awaits until the reproducing/stop button 17 is depressed. On the contrary, if an affirmative result is obtained in step SP1, this means that the reproducing/stop button 17 is depressed. At this time, the CPU 27 proceeds to the next step SP2.

In step SP2, the CPU 27 as reproducing limitation information detecting means reads "reproducing limitation data" from the header H1 of the digital music contents C1 that the user wants to reproduce, and determines whether or not the limitation on the reproducible period of time or the number of reproducible times has been added. Here, if a negative result is obtained, this means that the value of the "reproducing limitation data" is "0", that is, any reproducing limitation has not been added. At this time, the CPU 27 proceeds to the next step SP3.

Since the digital music contents C1 is contents bought by "purchase" to which no reproducing limitation has been added, in step SP3, the CPU 27 reproduces the music data D1 of the above digital music contents C1 by the DSP 32, and then proceeds to the next step SP9.

On the contrary, if an affirmative result is obtained in step SP2, this means that the digital music contents C1 has bought "with reproducing limitation". At this time, the CPU 27 proceeds to step SP4.

In step SP4, the CPU 27 determines whether or not the reproducing limitation added to the digital music contents C1 is to limit the reproducible period of time. Here, if a negative result is obtained, this means that the digital music contents C1 is limit to the number of reproducible times. At this time, the CPU 27 proceeds to number-of-reproduced-times limiting processing in the next subroutine RT2.

Figure 11:
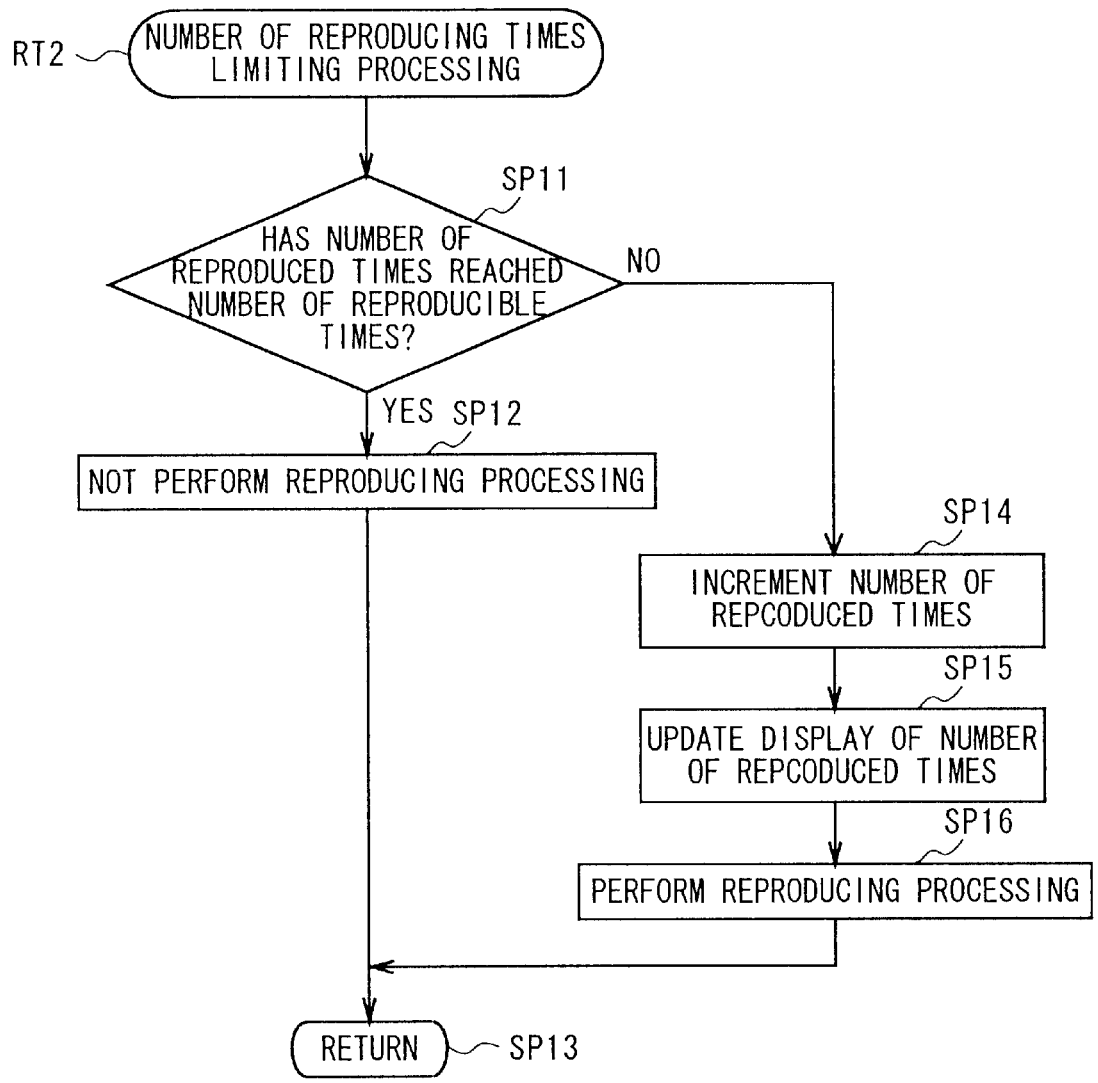
FIG. 11 is a flowchart showing number-of-reproducing-times limiting processing procedure.

As shown in FIG. 11, after entering the number-of-reproduced-times limiting processing of the subroutine RT2, the CPU 27 proceeds to the next step SP11. In step SP11, the CPU 27 reads "the number of reproducible times" and "the number of reproduced times" in the reproducing limitation information of the header H1, and determines whether or not "the number of reproduced times" at the present time point reaches "the number of reproducible times".

Here, if an affirmative result is obtained, this means that "the number of reproduced times" at the present time point has already reached to "the number of reproducible times" and it is necessary to limit the reproducing. At this time, the CPU 27 proceeds to the next step SP13 without executing the reproducing processing of the music data D1, and returning to the reproducing limitation processing procedure of the routine RT1.

On the contrary, if a negative result is obtained in step SP11, this means that "the number of reproduced times" at the present time point still does not reach "the number of reproducible times" and it is unnecessary to limit the reproducing. At this time, the CPU 27 proceeds to the next step SP14.

In step SP14, the CPU 27 as updating means increments and updates "the number of reproduced times" of the header H1 based on the depressing operation of the reproducing/stop button 17, and then proceeds to the next step SP15.

In step SP15, the CPU 27 updates the comment of "the number of reproduced times/the number of reproducible times" in the reproducing limitation display area 39 on the display unit 11, and then proceeds to the next step SP16.

In step SP16, the CPU 27 executes the reproducing processing of the music data D1 of the digital music contents C1 by the DSP 32, and then proceeds to the next step SP13 and returning to the reproducing limiting processing procedure of the routine RT1.

On the other hand, if an affirmative result is obtained in step SP4, this means that the digital music contents C1 is contents of which the reproducible period of time has been limited. At this time, the CPU 27 proceeds to the next step SP5.

In step SP5, the CPU 27 determines whether or not the actual "number of reproduced times" reaches "the number of reproducible times" previously prescribed in performing the reproducing limiting processing according to the reproducible period of time.

Here, if a negative result is obtained, this means that the actual "number of reproduced times" does not reach "the number of reproducible times" previously prescribed and the digital music contents C1 can be still reproduced even without checking the reproducible period of time. At this time, the CPU 27 proceeds to the next step SP6 to update the value of "the number of reproduced times", and then in step SP3, executes the reproducing processing of the music data D1 by the DSP 32 as reproducing means.

On the contrary, if an affirmative result is obtained in step SP5, this means that the actual "number of reproduced times" has reached "the number of reproducible times" previously prescribed. At this time, the CPU 27 proceeds to the next step SP7.

Since the actual "number of reproduced times" has reached "the number of reproducible times", in step SP7, the CPU 27 as display means displays a comment "Check the reproducible period of time" on the display unit 11 as display means to urge the user to check whether or not the digital music contents C1 is within the range of the reproducible period of time, and then proceeds to the next step SP8.

At this time point, the CPU 27 as reference date data getting means still has not done determination whether or not the digital music contents C1 is within the range of the reproducible period of time based on the time information T1 as reference date data on a reference date got from the computer device 3, and "the number of reproduced times" has not yet rewritten to "0". Therefore, in step SP8, the CPU 27 limits the reproducing processing without executing, and then proceeds to the next step SP9.

In this connection, the digital reproducing device 4 and the computer device 3 have been connected via the USB cable 24 as connecting means. And if the CPU 27 as confirming means recognized that the digital music contents C1 is within the range of the reproducible period of time based on the time information T1 supplied from the above computer device 3, the CPU 27 as rewriting means rewrites "the number of reproduced times" of the header H1 to "0" to return into a reproducible state, and executing the reproducing processing. On the other hand, if it recognized that the reproducible period of time has expired, the CPU 27 continues to limit the reproducing processing without executing.

In step SP9, the CPU 27 determines whether or not the reproducing/stop button 17 is depressed by the user. Here, if a negative result is obtained, this means that the reproducing/stop button 17 is not depressed. At this time, the CPU 27 returns to step SP2 and repeating the aforementioned processing to the next digital music contents C1.

On the contrary, if an affirmative result is obtained in step SP9, this means that the reproducing/stop button 17 is depressed by the user. At this time, the CPU 27 stops a series of reproducing limiting processing, and then returns to step SP1 to repeat the aforementioned processing again. Here the description of the reproducing limiting processing procedure has finished.

(4) Operation and Effects of This Embodiment

According to the above configuration, when in reproducing the digital music contents C1 downloaded in the flash memory 30, the digital reproducing device 4 first determines whether or not reproducing limitation on the reproducible period of time or the number of reproducible times has been added based on the "reproducing limitation data" of the header H1.

Here, when the limitation on the reproducible period of time has been added to the digital music contents C1 to be reproduced, if the actual "number of reproduced times" does not reach "the number of reproducible times" prescribed by the header H1, the digital reproducing device 4 executes the reproducing processing, but if it has been reached, it does not execute the reproducing processing.

And when the actual "number of reproduced times" has reached "the number of reproducible times" and unexecuting the reproducing processing, the digital reproducing device 4 displays a comment "Check the reproducible period of time" in the reproducing limitation display area 39 on the display unit 11 and urging the user to check the reproducible period of time.

After this, the digital reproducing device 4 is connected to the computer device 3 by the user and receiving supply of the time information T1. If the digital music contents C1 is within the range of the reproducible period of time based on the above time information T1, the digital reproducing device 4 rewrites "the number of reproduced times" of the header H1 to "0". Thus, the music data D1 can be reproduced up to "the number of reproducible times" again.

On the other hand, when the reproducible period of time has expired based on the time information T1, the digital reproducing device 4 does not rewrite "the number of reproduced times" of the header H1 to "0" and also does not execute the reproducing processing of the music data D1.

According to the above configuration, when it has determined that the reproducing limitation of the reproducible period of time has been added to the digital music contents C1 based on the reproducing limitation information of the header H1 of the digital music contents C1 recorded in the flash memory 30, if the actual "number of reproduced times" does not reach "the number of reproducible times" previously prescribed by the header H1, the digital reproducing device 4 executes the reproducing processing, but if it has been reached, the digital reproducing device 4 gives limitation to unexecute the reproducing processing. Thereby, reproducing processing without limitation that might be illegally done can be surely prevented.

On the other hand, the digital reproducing device 4 itself does not have an RTC circuit built-in, and determines whether or not the digital music contents C1 is within the range of the reproducible period of time or not based on the accurate time information T1 supplied from the computer device 3. If it is within the range of the reproducible period of time, the digital reproducing device 4 rewrites the value of "the number of reproduced times" of the header H1 to "0" and making it reproducible up to "the number of reproducible times" again. So that if it is within the range of the reproducing period of time, the reproducing processing can be repeatedly performed any number of times within the range of the number of reproducible times. Thus, illegal reproducing processing can be prevented, and at the same time, it never makes the user have his disadvantage.

Furthermore, since the digital reproducing device 4 itself does not have an RTC circuit built-in, its entire circuitry can be simplified and miniaturized, and at the same time, power consumption to be consumed by an RTC circuit can be reduced.

(5) Other Embodiments

In the aforementioned embodiment, it has dealt with the case where the digital reproducing device 4 determines whether or not the digital music contents C1 is within the range of the reproducible period of time or not based on the time information T1 supplied from the computer device 3, and when the reproducible period of time has expired, it limits the reproducing processing of the music data D1 without executing. However, the present invention is not only limited to this but also provided that the music data D1 is not reproduced in digital data of high sound quality, the reproducing processing can be executed with adding limitation that reproduces the music data D1 of deteriorated sound quality or reproduces it only for the first 30 seconds is added.

On the other hand, in the aforementioned embodiment, it has dealt with the case where the digital reproducing device 4 determines whether or not the digital music contents C1 is within the range of the reproducible period of time based on the time information T1 supplied from the computer device 3, and when it is within the range of the reproducible period of time, "the number of reproduced times" of the header H1 is rewritten to "0" and returns into the reproducible state. However, the present invention is not only limited to this but also such method that the CPU of the computer device 3 as a reproducing limitation information rewriting apparatus reads the header H1 of the digital music contents C1 from the digital reproducing device 4 via the USB cable 24 as connecting means, and confirming whether or not the digital music contents C1 is within the range of the reproducible period of time based on the time information T1 as reference date data on a date by a built-in clock, and if it is within the range of the reproducible period of time, "the number of reproduced times" of the header H1 is rewritten to "0" can be applied.

Figure 12:
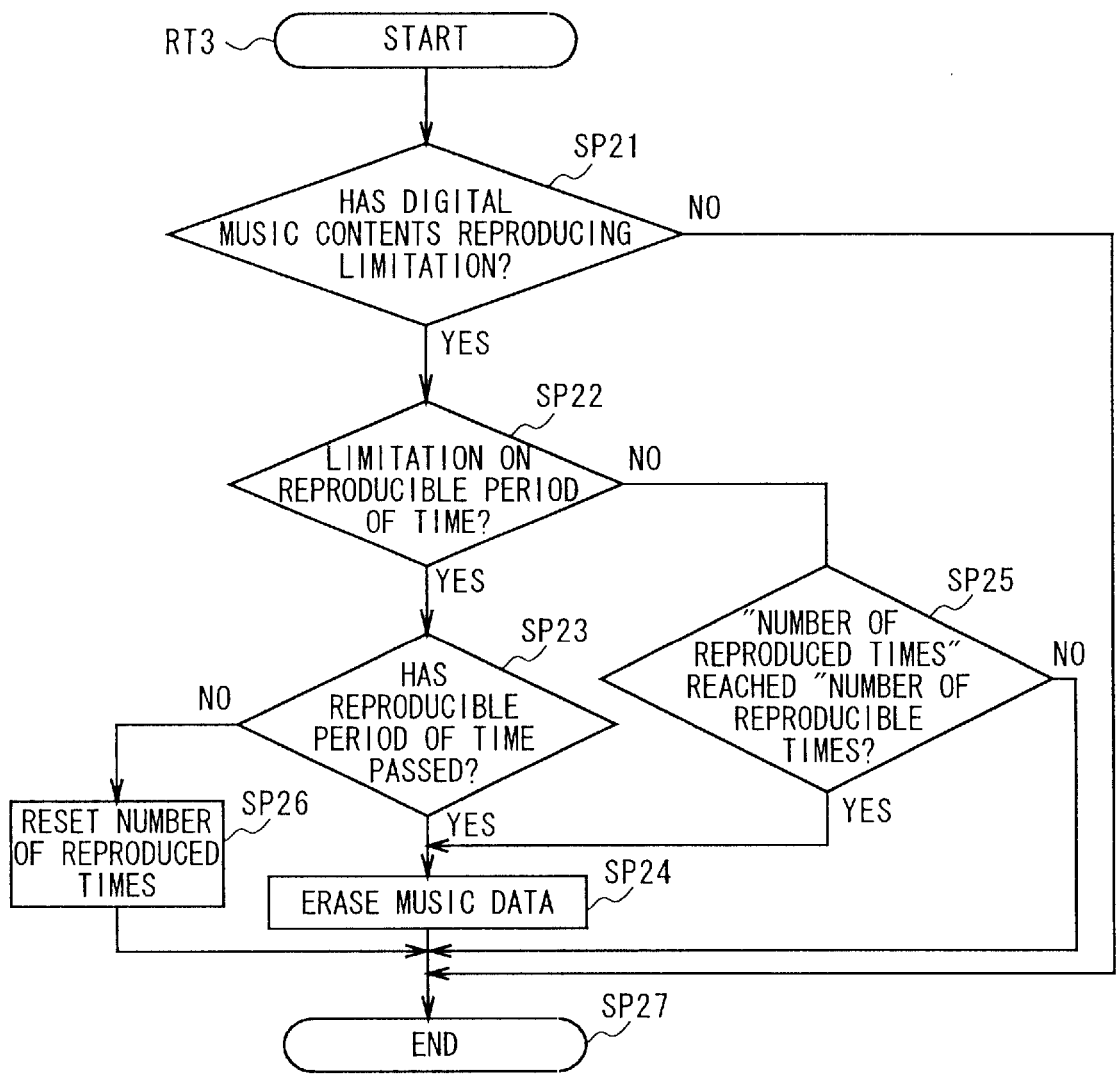
FIG. 12 is a flowchart showing reproducible-period-of-time confirming processing procedure in a computer device of another embodiment.

In this case, as shown in FIG. 12, the CPU of the computer device 3 enters the processing from the start step of routine RT3, and proceeds to step SP21.

In step SP21, the CPU as reproducing limitation information detecting means detects the header H1 of the digital music contents C1 from the digital reproducing device 4, and determines whether or not reproducing limitation has been added to the above header H1. Here, if a negative result is obtained, this means that the "reproducing limitation data" is a value "0", that is, reproducing limitation has not been added. At this time, the CPU 27 proceeds to step SP27 to finish the processing without performing confirming processing of the reproducible period of time.

On the contrary, if an affirmative result is obtained in step SP21, this means that the reproducing limitation has been added. At this time, the CPU 27 proceeds to the next step SP22.

In step SP22, the CPU determines whether or not the reproducing limitation added to the digital music contents C1 is to limit the reproducible period of time. Here, if an affirmative result is obtained, this means that the reproducing limitation is to limit the reproducible period of time. At this time, the CPU proceeds to the next step SP23.

In step SP23, the CPU as confirming means determines whether or not the reproducible period of time has passed based on the time information T1 as reference date data on a date by the built-in clock. Here, if an affirmative result is obtained, this means that the reproducible period of time has already passed at the present time point. At this time, the CPU proceeds to the next step SP24.

Since the reproducible period of time has passed, in step SP24, the CPU erases the music data D1 so as not to be reproduced, and proceeds to the next step SP27 and stopping the reproducible-period-of-time confirming processing procedure.

On the contrary, if a negative result is obtained in step SP22, this means that the reproducing limitation is limitation on the reproducible period of time but limitation on the number of reproduced times. At this time, the CPU proceeds to the next step SP25.

In step SP25, the CPU determines whether or not "the number of reproduced times" at the present time point reaches "the number of reproducible times". Here, if a negative result is obtained, "the number of reproduced times" has not been reached "the number of reproducible times", so that the CPU executes the reproducing processing, and proceeds to the next step SP27 and stopping the reproducible-period-of-time confirming processing procedure.

On the contrary, if an affirmative result is obtained in step SP25, this means that there is no limitation on reproducible period of times and "the number of reproduced times" has been reached "the number of reproducible times". At this time, the CPU proceeds to the next step SP24 to erase the music data D1.

On the other hand, if a negative result is obtained in step SP23, this means that the present time point is within the range of the reproducible period of time. At this time, the CPU proceeds to the next step SP26.

Since the present time point is within the range of the reproducible period of time, in step SP26, the CPU as control means rewrites "the number of reproduced times" of the digital reproducing device 4 to "0" to reset it, and setting so that the digital music contents C1 can be reproduced up to "the number of reproducible times" again. Then, the CPU proceeds to the next step SP27 and stopping the reproducible-period-of-time confirming processing procedure.

In the aforementioned embodiment, it has dealt with the case where "the number of reproducible times" prescribed by the header H1 of the digital music contents C1 to which limitation on the reproducible period of time has been added is set to twice, and at the time point where it has reproduced twice, checking the reproducible period of time is urged. However, the present invention is not only limited to this but also "the number of reproducible times" can be set to another various number of times such as once or five times or the like. Practically, the more "the number of reproducible times" is set to a smaller number, the more it can make the digital reproducing device 4 closely do the check of the reproducible period of time. Thus, executing further strict reproducing limiting processing is enabled.

In the aforementioned embodiment, it has dealt with the case where the check of the reproducible period of time is urged at the time point where "the number of reproducible times" prescribed by the header H1 of the digital music contents C1 has reproduced, and if the time point is still within the range of the reproducible period of time, the digital music contents C1 can be reproduced up to "the number of reproducible times" again. However, the present invention is not only limited to this but also such method that "the number of reproducible times" is set to, for example 20 times, and when it has already reproduced up to 20 times even within the range of the reproducible period of time, the reproducing after that is limited can be applied.

Furthermore, in the aforementioned embodiment, it has dealt with the case where the present invention is applied to the digital music contents C1 as data to which the reproducing limitation information has been added. However, the present invention is not only limited to this but also it can be applied to data in other various categories such as game program or the like.

Furthermore, in the aforementioned embodiment, it has dealt with the case of using the digital reproducing device 4 having the flash memory 30 previously built in. However, the present invention is not only limited to this but also a digital reproducing device using a detachable magneto-optical disc or a flash memory called "memory stick" (trademark) as a recording medium can be used.

Moreover, in the aforementioned embodiment, it has dealt with the case where the CPU 27 limits the reproducing processing of the digital music contents C1 based on the reproducing limiting program previously stored in the EEPROM 34. However, the present invention is not only limited to this but also the reproducing processing can be limited by installing a reproducing limiting program in the digital reproducing device 4 using a program storage medium in which the reproducing limiting program has been stored.

As the program storage medium that will be used to make an executable state by the above digital reproducing device 4 by installing the reproducing limiting program for performing the aforementioned reproducing limiting processing in the digital reproducing device 4, it can be realized by a semiconductor memory, a magnetic disc, etc., that can store the program temporarily or permanently, without only limiting to package media such as a floppy disk, a compact disc read-only memory (CD-ROM), a digital versatile disc (DVD), etc. On the other hand, as means for storing the program in these program storage media, the program can be stored by interposing various communication interface such as Local Area Network, Internet, digital satellite broadcasting, etc.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A reproducing device having reproducing limiting function, comprising:

reproducing limitation information detecting means for detecting reproducing limitation information from contents data stored in a prescribed recording medium, having said reproducing limitation information that is composed of a reproducible time of period, the number of reproducible times and the number of reproduced times and reproducing data;

reproducing instructing means for instructing the reproducing device to reproduce said reproducing data;

updating means, in the case where said reproducible period of time has been detected by said reproducing limitation information detecting means, if a reproducing instruction is given from said reproducing instructing means, for incrementing and updating said number of reproduced times according to the above instruction; and reproducing means, in the case where said reproducible period of time has been detected by said reproducing limitation information detecting means, if a reproducing instruction is given from said reproducing instructing means, if said number of reproduced times is within the range of said number of reproducible times, for reproducing said reproducing data according to said instruction;

wherein when said reproducing means reproduces said reproducing data although said number of reproduced times is over said number of reproducible times, it limits the above reproducing data to be reproduced only for a predetermined period of time.

2. The reproducing device having reproducing limiting function according to claim 1, including:

display means, when said instruction to reproduce said reproducing data has been given from said reproducing instructing means although said number of reproduced times is over said number of reproducible times, for performing predetermined display to urge a user to confirm whether or not said reproducing data is within the range of said reproducible period of time.

3. The reproducing device having reproducing limiting function according to claim 1, including:

connecting means for connecting the reproducing device to an external device;

reference date data getting means for getting reference date data on a date to be reference from said external device via said connecting means;

confirming means for confirming whether or not said reproducing data is within the range of said reproducible period of time based on said reference date data; and rewriting means, when being within the range of said reproducible period of time, for rewriting said number of reproduced times to zero.

4. A reproducing device having reproducing limiting function, comprising:

reproducing limitation information detecting means for detecting reproducing limitation information from contents data stored in a prescribed recording medium, having said reproducing limitation information that is composed of a reproducible time of period, the number of reproducible times and the number of reproduced times and reproducing data;

reproducing instructing means for instructing the reproducing device to reproduce said reproducing data;

updating means, in the case where said reproducible period of time has been detected by said reproducing limitation information detecting means, if a reproducing instruction is given from said reproducing instructing means, for incrementing and updating said number of reproduced times according to the above instruction;

reproducing means, in the case where said reproducible period of time has been detected by said reproducing limitation information detecting means, if a reproducing instruction is given from said reproducing instructing means, if said number of reproduced times is within the range of said number of reproducible times, for reproducing said reproducing data according to said instruction; and display means, when said instruction to reproduce said reproducing data has been given from said reproducing instructing means although said number of reproduced times is over said number of reproducible times, for performing predetermined display to urge a user to confirm whether or not said reproducing data is within the range of said reproducible period of time.

5. A reproducing device having reproducing limiting function, comprising:

reproducing limitation information detecting means for detecting reproducing limitation information from contents data stored in a prescribed recording medium, having said reproducing limitation information that is composed of a reproducible time of period, the number of reproducible times and the number of reproduced times and reproducing data;

reproducing instructing means for instructing the reproducing device to reproduce said reproducing data;

updating means, in the case where said reproducible period of time has been detected by said reproducing limitation information detecting means, if a reproducing instruction is given from said reproducing instructing means, for incrementing and updating said number of reproduced times according to the above instruction;

reproducing means, in the case where said reproducible period of time has been detected by said reproducing limitation information detecting means, if a reproducing instruction is given from said reproducing instructing means, if said number of reproduced times is within the range of said number of reproducible times, for reproducing said reproducing data according to said instruction;

connecting means for connecting the reproducing device to an external device;

reference date data getting means for getting reference date data on a date to be reference from said external device via said connecting means;

confirming means for confirming whether or not said reproducing data is within the range of said reproducible period of time based on said reference date data; and rewriting means, when being within the range of said reproducible period of time, for rewriting said number of reproduced times to zero.

6. A reproducing device having reproducing limiting function, comprising:

storing means for storing contents data having reproducing limitation information that is composed of a reproducible time of period, the number of reproducible times and the number of reproduced times and reproducing data;

reproducing limitation information detecting means for detecting said reproducing limitation information from said contents data;

reproducing instructing means for instructing the reproducing device to reproduce said reproducing data;

updating means, in the case where said reproducible period of time has been detected by said reproducing limitation information detecting means, if a reproducing instruction is given from said reproducing instructing means, for incrementing and updating said number of reproduced times according to the above instruction; and reproducing means, in the case where said reproducible period of time has been detected by said reproducing limitation information detecting means, if a reproducing instruction is given from said reproducing instructing means, if said number of reproduced times is within the range of said number of reproducible times, for reproducing said reproducing data according to said instruction;

wherein when said reproducing means reproduces said reproducing data although said number of reproduced times is over said number of reproducible times, it limits the above reproducing data to be reproduced only for a predetermined period of time.

7. The reproducing device having reproducing limiting function according to claim 6, including:

display means, when said instruction to reproduce said reproducing data has been given from said reproducing instructing means although said number of reproduced times is over said number of reproducible times, for performing predetermined display to urge a user to confirm whether or not said reproducing data is within the range of said reproducible period of time.

8. The reproducing device having reproducing limiting function according to claim 6, including:

connecting means for connecting the reproducing device to an external device;

reference date data getting means for getting reference date data on a date to be reference from said external device via said connecting means;

confirming means for confirming whether or not said reproducing data is within the range of said reproducible period of time based on said reference date data; and rewriting means, when being within the range of said reproducible period of time, for rewriting said number of reproduced times to zero.

9. A reproducing device having reproducing limiting function, comprising:

storing means for storing contents data having reproducing limitation information that is composed of a reproducible time of period, the number of reproducible times and the number of reproduced times and reproducing data;

reproducing limitation information detecting means for detecting said reproducing limitation information from said contents data;

reproducing instructing means for instructing the reproducing device to reproduce said reproducing data;

updating means, in the case where said reproducible period of time has been detected by said reproducing limitation information detecting means, if a reproducing instruction is given from said reproducing instructing means, for incrementing and updating said number of reproduced times according to the above instruction;

reproducing means, in the case where said reproducible period of time has been detected by said reproducing limitation information detecting means, if a reproducing instruction is given from said reproducing instructing means, if said number of reproduced times is within the range of said number of reproducible times, for reproducing said reproducing data according to said instruction; and display means, when said instruction to reproduce said reproducing data has been given from said reproducing instructing means although said number of reproduced times is over said number of reproducible times, for performing predetermined display to urge a user to confirm whether or not said reproducing data is within the range of said reproducible period of time.

10. A reproducing device having reproducing limiting function, comprising:

storing means for storing contents data having reproducing limitation information that is composed of a reproducible time of period, the number of reproducible times and the number of reproduced times and reproducing data;

reproducing limitation information detecting means for detecting said reproducing limitation information from said contents data;

reproducing instructing means for instructing the reproducing device to reproduce said reproducing data;

updating means, in the case where said reproducible period of time has been detected by said reproducing limitation information detecting means, if a reproducing instruction is given from said reproducing instructing means, for incrementing and updating said number of reproduced times according to the above instruction;

reproducing means, in the case where said reproducible period of time has been detected by said reproducing limitation information detecting means, if a reproducing instruction is given from said reproducing instructing means, if said number of reproduced times is within the range of said number of reproducible times, for reproducing said reproducing data according to said instruction;

connecting means for connecting the reproducing device to an external device;

reference date data getting means for getting reference date data on a date to be reference from said external device via said connecting means;

confirming means for confirming whether or not said reproducing data is within the range of said reproducible period of time based on said reference date data; and rewriting means, when being within the range of said reproducible period of time, for rewriting said number of reproduced times to zero.

11. A reproducing limiting method comprising the steps of:

detecting reproducing limitation information from contents data stored in a prescribed storage medium, having said reproducing limitation information that is composed of a reproducible time of period, the number of reproducible times and the number of reproduced times and reproducing data;

when said reproducible period of time has been detected in said step of detecting reproducing limitation information, if a reproducing instruction is given, incrementing and updating said number of reproduced times according to the above instruction; and when said reproducible period of time has been detected in said step of detecting reproducing limitation information, if said number of reproduced times is within the range of said number of reproducible times, reproducing said reproducing data according to said instruction;

wherein when said step of reproducing reproduces said reproducing data although said number of reproduced times is over said number of reproducible times, it limits the above reproducing data to be reproduced only for a predetermined period of time.

12. The reproducing limiting method according to claim 11, including the steps of:

getting reference date data on a date to be reference from an external device by connecting to said external device;

confirming whether or not said reproducing data is within the range of said reproducible period of time based on said reference date data; and when being within the range of said reproducible period of time, rewriting said number of reproduced times to zero.

13. A reproducing limiting method comprising the steps of:

detecting reproducing limitation information from contents data stored in a prescribed storage medium, having said reproducing limitation information that is composed of a reproducible time of period, the number of reproducible times and the number of reproduced times and reproducing data;

when said reproducible period of time has been detected in said step of detecting reproducing limitation information, if a reproducing instruction is given, incrementing and updating said number of reproduced times according to the above instruction;

when said reproducible period of time has been detected in said step of detecting reproducing limitation information, if said number of reproduced times is within the range of said number of reproducible times, reproducing said reproducing data according to said instruction; and when said instruction to reproduce said reproducing data has been given from said reproducing instructing means although said number of reproduced times is over said number of reproducible times, performing predetermined display to urge a user to confirm whether or not said reproducing data is within the range of said reproducible period of time.

14. A reproducing limiting method comprising the steps of:

detecting reproducing limitation information from contents data stored in a prescribed storage medium, having said reproducing limitation information that is composed of a reproducible time of period, the number of reproducible times and the number of reproduced times and reproducing data;

when said reproducible period of time has been detected in said step of detecting reproducing limitation information, if a reproducing instruction is given, incrementing and updating said number of reproduced times according to the above instruction;

when said reproducible period of time has been detected in said step of detecting reproducing limitation information, if said number of reproduced times is within the range of said number of reproducible times, reproducing said reproducing data according to said instruction;

getting reference date data on a date to be reference from an external device by connecting to said external device;

confirming whether or not said reproducing data is within the range of said reproducible period of time based on said reference date data; and when being within the range of said reproducible period of time, rewriting said number of reproduced times to zero.

15. A program storage medium for making a reproducing device execute a program, comprising the steps of:

detecting reproducing limitation information from contents data stored in a prescribed storage medium, having said reproducing limitation information that is composed of a reproducible time of period, the number of reproducible times and the number of reproduced times and reproducing data;

when said reproducible period of time has been detected in said stop of detecting reproducing limitation information, if a reproducing instruction is given, incrementing and updating said number of reproduced times according to the above instruction; and when said reproducible period of time has been detected in said stop of detecting reproducing limitation information, if said number of reproduced times is within the range of said number of reproducible times, reproducing said reproducing data according to said instruction;

wherein when said step of reproducing reproduces said reproducing data although said number of reproduced times is over said number of reproducible times, it limits the above reproducing data to be reproduced only for a predetermined period of time.

16. The program storage medium for making a reproducing device execute a program according to claim 15, including the steps of:

getting reference date data on a date to be reference from an external device by connecting to said external device;

confirming whether or not said reproducing data is within the range of said reproducible period of time based on said reference date data; and when being within the range of said reproducible period of time, rewriting said number of reproduced times to zero.

17. A program storage medium for making a reproducing device execute a program, comprising the steps of:

detecting reproducing limitation information from contents data stored in a prescribed storage medium, having said reproducing limitation information that is composed of a reproducible time of period, the number of reproducible times and the number of reproduced times and reproducing data;

when said reproducible period of time has been detected in said stop of detecting reproducing limitation information, if a reproducing instruction is given, incrementing and updating said number of reproduced times according to the above instruction;

when said reproducible period of time has been detected in said stop of detecting reproducing limitation information, if said number of reproduced times is within the range of said number of reproducible times, reproducing said reproducing data according to said instruction; and when said instruction to reproduce said reproducing data has been given from said reproducing instructing means although said number of reproduced times is over said number of reproducible times, performing predetermined display to urge a user to confirm whether or not said reproducing data is within the range of said reproducible period of time.

18. A program storage medium for making a reproducing device execute a program, comprising the steps of:

detecting reproducing limitation information from contents data stored in a prescribed storage medium, having said reproducing limitation information that is composed of a reproducible time of period, the number of reproducible times and the number of reproduced times and reproducing data;

when said reproducible period of time has been detected in said stop of detecting reproducing limitation information, if a reproducing instruction is given, incrementing and updating said number of reproduced times according to the above instruction;

when said reproducible period of time has been detected in said stop of detecting reproducing limitation information, if said number of reproduced times is within the range of said number of reproducible times, reproducing said reproducing data according to said instruction;

getting reference date data on a date to be reference from an external device by connecting to said external device;

confirming whether or not said reproducing data is within the range of said reproducible period of time based on said reference date data; and when being within the range of said reproducible period of time, rewriting said number of reproduced times to zero.

* * * * *